(12) United States Patent
Zhang

(10) Patent No.: US 9,235,210 B2
(45) Date of Patent: Jan. 12, 2016

(54) REMOTE-CONTROLLED MOBILE WARNING SIGN

(71) Applicant: Jiajun Zhang, Zhuhai (CN)

(72) Inventor: Jiajun Zhang, Zhuhai (CN)

(73) Assignee: Jiajun Zhang, Zhuhai (CN)

( * ) Notice: Subject to any disclaimer, the term of this patent is extended or adjusted under 35 U.S.C. 154(b) by 0 days.

(21) Appl. No.: 14/389,584

(22) PCT Filed: Apr. 11, 2013

(86) PCT No.: PCT/CN2013/074106
§ 371 (c)(1),
(2) Date: Sep. 30, 2014

(87) PCT Pub. No.: WO2013/152733
PCT Pub. Date: Oct. 17, 2013

(65) Prior Publication Data
US 2015/0073623 A1 Mar. 12, 2015

(30) Foreign Application Priority Data
Apr. 12, 2012 (CN) .......................... 2012 1 0106515

(51) Int. Cl.
*G05D 1/00* (2006.01)
*G09F 13/16* (2006.01)
*B60Q 7/00* (2006.01)

(52) U.S. Cl.
CPC ................ *G05D 1/0011* (2013.01); *B60Q 7/00* (2013.01); *G09F 13/16* (2013.01)

(58) Field of Classification Search
CPC combination set(s) only.
See application file for complete search history.

(56) References Cited

FOREIGN PATENT DOCUMENTS

CN 20173769 * 1/2011

* cited by examiner

*Primary Examiner* — Thomas Tarcza
*Assistant Examiner* — Edward Pipala
(74) *Attorney, Agent, or Firm* — Anova Law Group, PLLC

(57) ABSTRACT

A remote-controlled mobile triangle sign includes a triangle sign having at least one surface with a reflective area; a remote controller configured to transmit control signals; and a remote-controlled car. The remote-controlled car includes a power supply module; a drive motor powered by the power supply module; and a remote control receiving and execution module for receiving the control signals. The triangle sign is mounted on top of the remote-controlled car, and the remote control receiving and execution module is electrically connected to the drive motor and provides output signals.

20 Claims, 12 Drawing Sheets

REMOTE-CONTROLLED MOBILE WARNING SIGN

CROSS-REFERENCES TO RELATED APPLICATIONS

This application is a national stage entry of PCT Application No. PCT/CN2013/074106, entitled "A REMOTE-CONTROLLED MOBILE TRIANGLE SIGN" and filed on Apr. 11, 2013, which claims priority to Chinese Patent Application No. 201210106515.0, filed on Apr. 12, 2012, the entire contents of which are incorporated herein by reference.

FIELD OF THE INVENTION

The present invention generally relates to a remote-controlled mobile triangle sign and, more particularly, to an advance-warning triangle sign, in case of an automobile breakdown or stoppage, with strong visibility and fast placement without manual operation to reduce chain accidents after traffic accidents and to provide security for drivers.

BACKGROUND

With people's standard of living gradually improved, cars have become the most important means of transport in people's daily lives. More and more people buy cars, but the numbers of road accidents are also on the rise, especially rear-end collisions accounting for a relatively large proportion of accidents, often causing heavy casualties and economic losses.

Most rear-end collisions are generally caused by, after a front vehicle involved in an accident or breakdown, advance-warning not being promptly given, which cause following vehicles to have rear-end collisions to create more and severer traffic accidents. The rear-end collisions are also caused by the poor visibility and closeness to the accident scene of the warning equipment of the vehicle involved in the accident, the following vehicles do not have sufficient response time or response distance, causing severer traffic accidents. Thus, as required by transportation authorities, after a road accident, an advance-warning device must be used to warn the following vehicles, at a distance of 100~250 meters.

Currently, an advance-warning device is often a triangle sign placed in car trunk. The triangle sign typically has a reflective region. When the vehicle is breakdown or in accident, the triangle sign is placed in the rear of the vehicle to warn the oncoming cars from behind. For example, on a highway with 110 km/h speed limit, when a vehicle breaks down at night, the driver needs to get out of the vehicle and takes the warning triangle sign out of the trunk, walks at least a safe distance behind the breakdown vehicle, and then places the warning triangle sign to warn the oncoming vehicles. Afterward, the driver needs to retrieve the warning triangle sign.

According to the traffic regulations, the safe distance of 250 meters, which means that the driver is required to walking back and forth twice, at least 1000 meters. Due to human laziness, under the on-site emergency and hazardous situation, people usually do not follow the regulations to place the triangle sign. Even when people follow the regulation to place the triangle sign, it may take a long time to place it, i.e., a slow placement. The study showed that: the probability of occurrence of the secondary accident, or two or more car rear-end accident after more than 10 seconds, is proportional to the time for placing the triangle sign. That is, the shorter the placement time, the smaller the probability of occurrence of the secondary accident.

In addition, when the driver walk on the roadway by foot to place the car triangle sign, especially at night, rain, fog, snow and other inclement weather without clear line of sight, it may lead to more severer traffic accidents, not to mention traffic accidents occurred under these weather conditions account 82.5% of total accidents. Furthermore, when the existing triangle signs are used under the rain and fog weather or at night, their visibility is very low, the warning distance is short, and the effect is not desired.

BRIEF SUMMARY OF THE INVENTION

Technical Solutions

The present invention overcomes the deficiencies of the existing technologies and provides a remote-controlled mobile triangle sign with desired warning effect, speedy placement, and self safety protection.

The technical solutions according to the present invention include: a remote-controlled mobile triangle sign includes a triangle sign having at least one surface with a reflective area; a remote control configured to transmit control signals; and a remote-controlled car. The remote-controlled car includes a power supply module; a drive motor powered by the power supply module; and a remote control receiving and execution module for receiving the control signals, wherein the triangle sign is mounted on top of the remote-controlled car, and the remote control receiving and execution module is electrically connected to the drive motor and provides output signals.

Further, the remote-controlled car further includes a folding motor configured to receive the output signals from the remote control receiving and execution module and being connected with the triangle sign through a folding arm.

Further, a front surface and/or a back surface of the triangle sign is provided with a laser source electrically connected to the remote control receiving and execution module, the laser source emits red or blue laser beam. Preferably, the laser source emits flashing laser beam, and the laser source emits laser beam downwardly.

Preferably, the triangle sign includes a support plate supported by the folding arm; a first folding member and a second folding member are disposed at two sides of the support plate, respectively, the support plate is connected with the first folding member through a first elastic member, and the support plate is connected with the second folding member through a second elastic member; and a third folding member is disposed on top of the support plate, and the support plate is connected with the third folding member through a third elastic member.

Further, at least one nip member is disposed on edges of the third folding member, and the at least one nip member is pressed on the first folding member and the second folding member; and a locking latch hole is disposed on a front surface of the third folding member, and a latch capable of being inserted into the locking latch hole is disposed on the remote-controlled car.

Further, a rotating motor mounted inside the remote-controlled car, and the rotating motor drives a paddle to rotate; and one end of the paddle presses on one end of the latch to drive the latch to rotate.

Further, the support plate is connected to top of the remote-controlled car with a fourth elastic member.

Further, a first LED warning light is disposed on a top corner of each of the first folding member, the second folding member, and the third folding member; and an LED lamp is disposed on back of the third folding member.

Further, one or more second LED warning light are disposed on front of the triangle sign. The second LED warning list are stripe-shaped and each second LED warning light is disposed on each frame of the triangle sign.

Alternatively, the triangle sign is a foldable triangle sign; three corners of the triangle sign are capable of being folded toward a center and locked by a locking buckle; elastic components are placed at folding junctures of the three corners; the locking buckle includes latches arranged on the three corners of the triangle sign and a locking latch hole matching the latches on the remote-controlled car; and the locking buckle has an electromagnetic switch electrically connected with the remote control receiving and execution module.

Further, an upper corner of the triangle sign is unfolded to form a smaller triangle sign; an LED warning light electrically connected with the power supply module and the remote control receiving and execution module is mounted at a front surface of the smaller triangle sign; and an LED lamp for determining a remote control distance is mounted at a back surface of the smaller triangle sign.

Further, a laser source electrically connected with the remote control receiving and execution module is mounted at the front surface of the smaller triangle sign.

Further, at least one windproof rod disposed on front of the triangle sign, with one end of the windproof rod being connected to the front of the triangle sign with a fifth elastic member.

Further, a grounding rubber sheet is disposed on a bottom end of the triangle sign.

Further, a friction sheet is disposed on a bottom end of the triangle sign and, when the triangle sign is propped upright, presses on tires of the remote-controlled car.

Further, the remote-controlled car includes a front car body and a rear car body, the front car body and the rear car body are stretchable and retractable against each other and are connected by a locking groove.

Further, a flashing light electrically connected with the remote control receiving and execution module is mounted on an outer wall of the remote-controlled car.

Further, the remote-controlled car includes a functional setting switch, a USB charging interface, and a wireless charging kit.

Further, the remote-controlled car includes a steering motor powered by the power supply module.

Further, the folding arm includes a first lever and a second lever hinged together, wherein one end of the first lever is hinged on the remote-controlled car, one end of the second lever is fixed on the support plate, and the first lever has an elongated sliding chute; and a driving lever driven by the folding motor, an end of the driving lever has a latch being inserted into the sliding chute and moving back and forth in the sliding chute.

Beneficial Effects

Beneficial effects of the present invention include: the remote-controlled mobile triangle sign includes a remote-controlled car equipped with a power supply module, a battery pack, a drive motor, and a steering motor. The remote-controlled car has a remote control receiving and execution module and equipped with a matching remote control. The battery pack, drive motor, and steering motor are electrically connected with the power supply module, respectively. One end of the remote-controlled car is mounted with a triangle sign with one or more reflective areas. In the event of vehicle breakdown or traffic accident, the remote-controlled car can be placed on the road, and the remote control can be used to expand two wings of the triangle sign and to unfold a smaller triangle sign. According to the scene, functions can be set, and the driver and passengers can stay at a safe areas outside the scene of the accident to remote control the remote-controlled car together with the triangle sign to reach the designated position quickly, and further to remote control unfolding the large triangle sign and being positioned. The reflective areas and LED warning lights on the triangle sign can immediately achieve the advance-warning effect as soon as it is unfolded. During the entire process, the advance-warning device can be well-placed just through the remote control, very safe, fast and convenient.

Especially at night or under rain, fog, snow and other inclement weather condition without clear line of sight, according to research, the use of laser to form a 0.8 $m^2$ flashing red triangle sign can expand effective visible distance by 3-5 times, making it easy for oncoming vehicle to notice in advance the vehicle in the accident, providing sufficient time and distance for processing, and ensuring the safety distance between two vehicles.

The triangle sign is a folding triangle sign. When in use, the switch to the locking buckle can be opened by the remote control. Under the action of torsion spring or other elastic member, the three corners of the triangle sign is automatically unfolded from the folded state. After arrival at the advance-warning position, the folding motor is remote-controlled to prop the triangle sign upright, very convenient. When the triangle sign is not in use, it can be folded together with remote-controlled car, greatly saving storage space.

Further, the remote-controlled is configured to have a front car body and a rear car body, connected together by a locking groove, making the remote-controlled car expandable and retractable, effectively saving the storage space for the remote-controlled triangle sign. At the same time, when traveling, the ground contact surface area can be increased, the center of gravity can be lowered, and moving stability can be improved.

Further, the triangle sign is provided with a laser source capable of emitting red and blue laser beam. Compared with existing car triangle sign, visibility of the triangle sign under rain and fog condition is significantly enhanced.

In addition, LED warning lights are disposed on the triangle sign and emit flashing light, making effective warnings to the oncoming cars and enabling the oncoming cars to notice the existence of the triangle sign.

In addition, grounding rubber sheets are placed on the triangle sign where it contacts the ground. After the remote-controlled car reaches the designated position, the folding motor unfolds the triangle sign, and the triangle sign contact the road surface through the grounding rubber sheets, forming two pivot points and elevating the front wheels of the remote-controlled car to free of pressure, which can prevent the movement of the remote-controlled car due to uneven road surface or other environmental factors, ensuring the placement stability of the remote-controlled mobile triangle sign.

The present invention is further illustrated, together with the accompanying drawings and various embodiments, in the followings.

DETAILED DESCRIPTION

The followings, together with accompanying drawings, describe in detail certain embodiments of the present invention. It should be noted that, when there is no conflict, the disclosed embodiments and features in the embodiments may be combined among one another.

FIGS. 1 through 8 shows an embodiment of the present invention, in this embodiment, the remote-controlled mobile triangle sign includes a remote-controlled car 1 and a triangle sign 3 mounted on the top of the remote-controlled car 1. The remote-controlled car 1 is mounted with a power supply module, a battery, a steering motor, and a drive motor. The power supply module, battery, steering motor, and drive motor are mounted inside the remote-controlled car body, and therefore not visible in FIGS. 1 to 8.

The power supply module provides power for the remote-controlled car 1 to move. The power supply module may provide power directly by a rechargeable battery or a battery pack. Also a USB charging port 16 may be disposed on the remote-controlled car 1 and can be connected with a wireless charging kit 27 to charge the battery or the battery pack.

Figure 1:
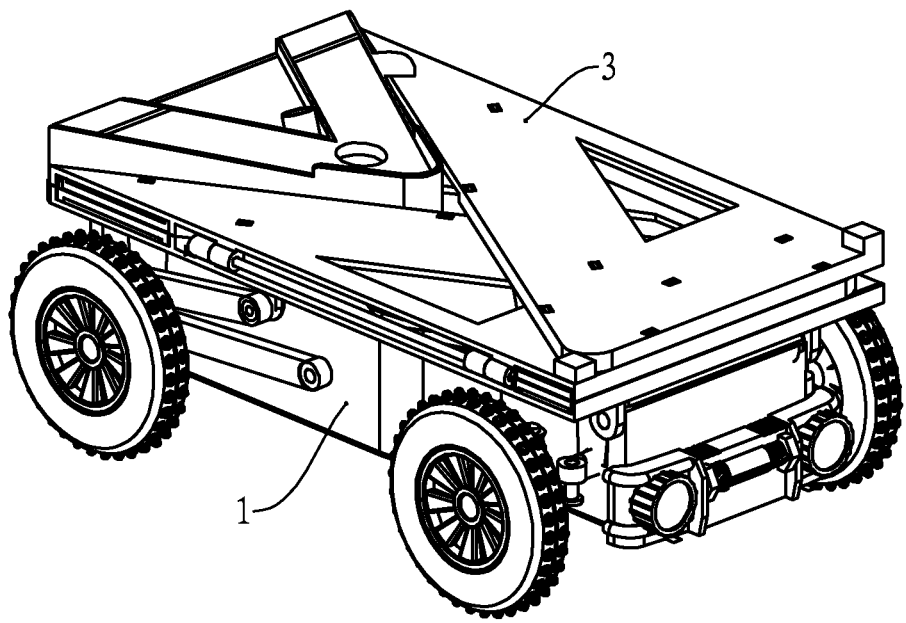
FIG. 1 illustrates a structural diagram of a folded state of the first embodiment of the present invention.
Figure 2:
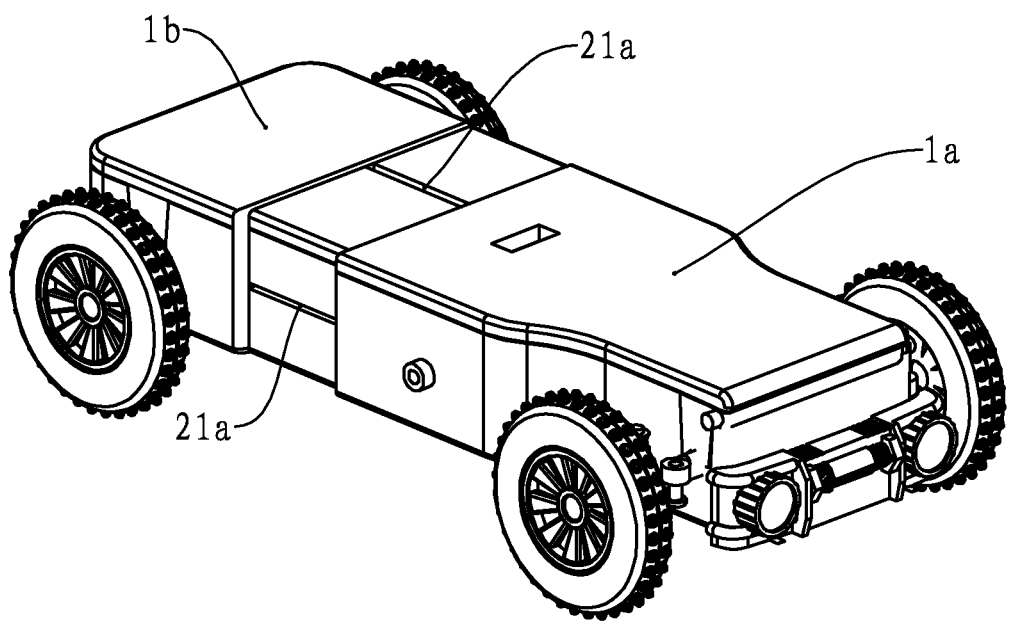
FIG. 2 illustrates a structural diagram of an expanded front car body and rear car body of a remote controlled card of the first embodiment of the present invention.
Figure 3:
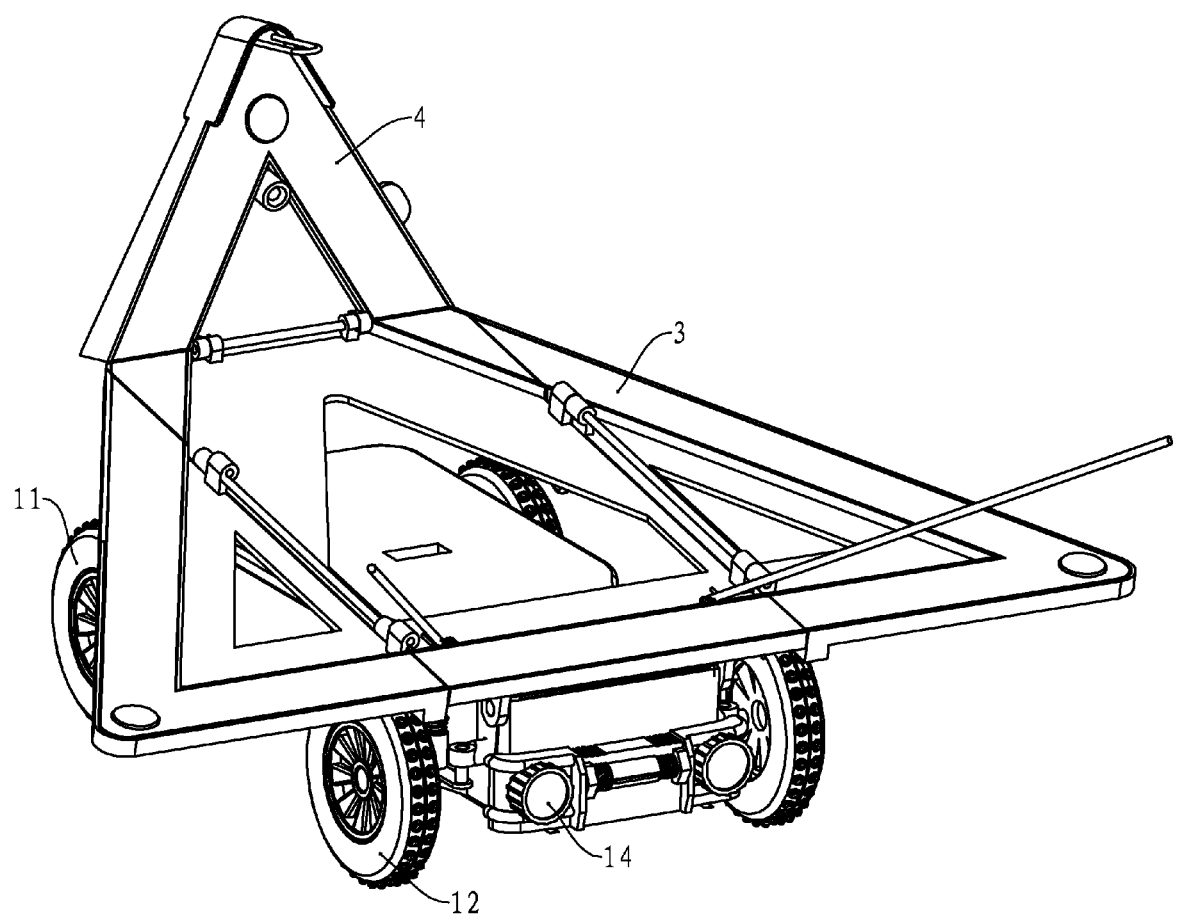
FIG. 3 illustrates a structural diagram of an unfolded smaller triangle sign of the first embodiment of the present invention.
Figure 4:
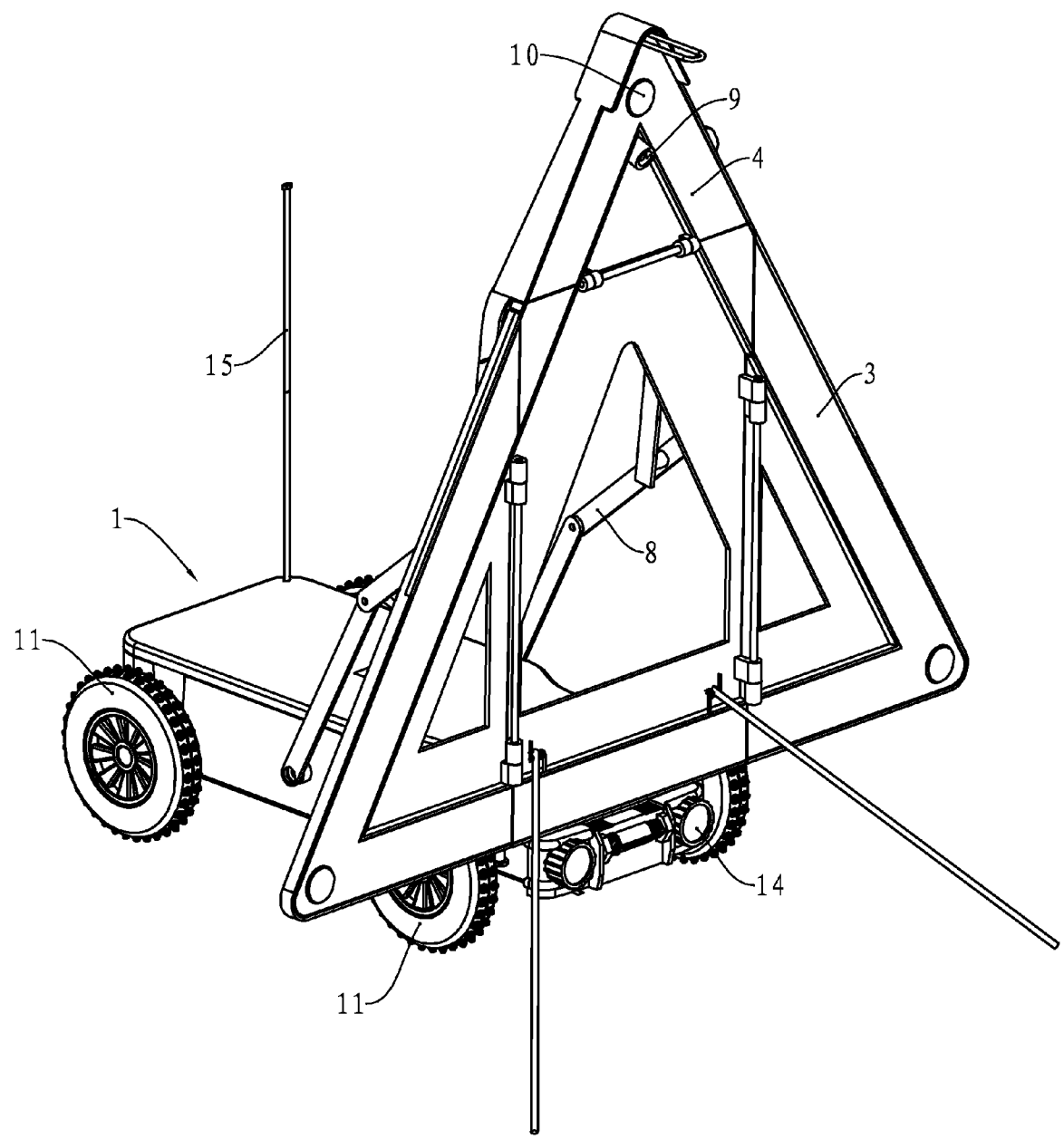
FIG. 4 illustrates a structural diagram of a front view of an unfolded triangle sign of the first embodiment of the present invention.
Figure 5:
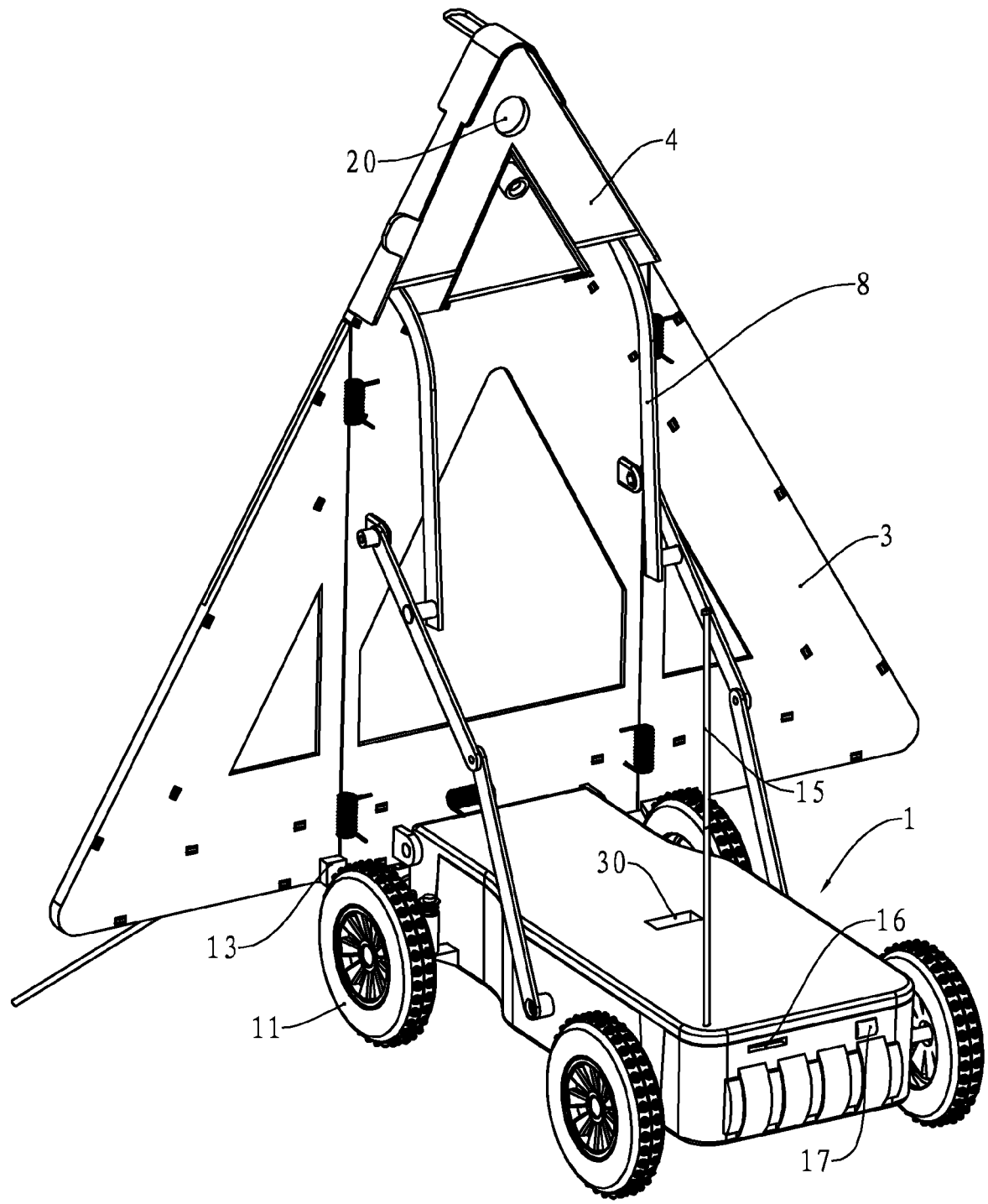
FIG. 5 illustrates a structural diagram of a rear view of an unfolded triangle sign of the first embodiment of the present invention.
Figure 6:
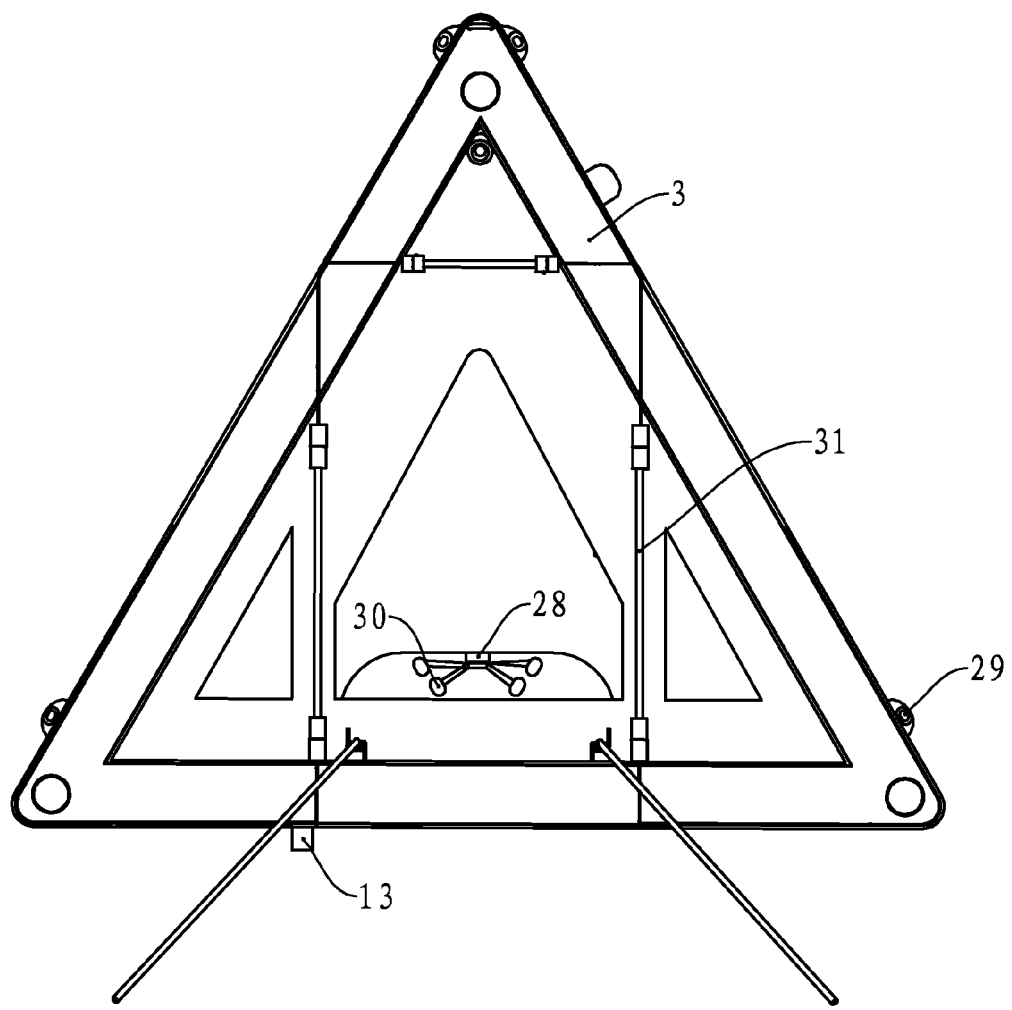
FIG. 6 illustrates a structural diagram of a triangle sign of the first embodiment of the present invention.
Figure 7:
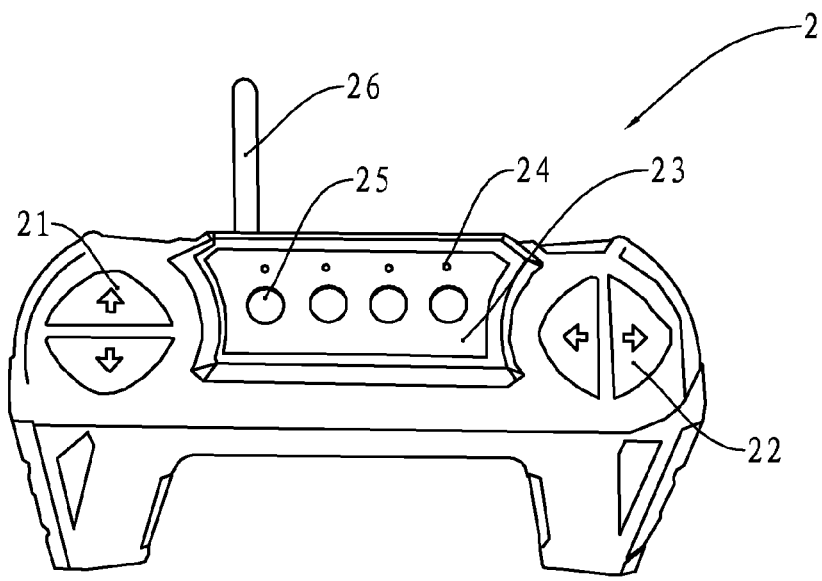
FIG. 7 illustrates a structural diagram of a remote control of the first embodiment of the present invention.
Figure 8:
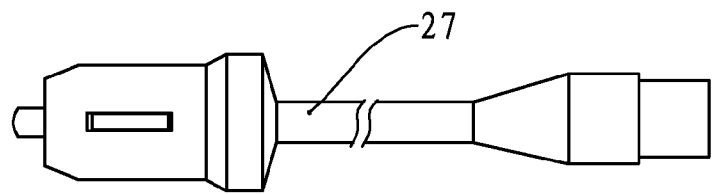
FIG. 8 illustrates a structural diagram of a wireless charging kit of the first embodiment of the present invention.

The remote-controlled car 1 is provided with a remote control receiving and execution module for receiving the control signal from a remote controller 2. Because the remote control receiving and execution module is also mounted inside the body of the remote-controlled car 1 and, thus, are invisible in FIGS. 1 through 8. As shown in FIG. 7, the remote control 2 includes a remote control command transmitting module 23 and a plurality of control function keys, such as forward and back keys 21, left and right keys 22, function-key group 25 and status indicator 24. The driver can quickly and easily control the movement of the remote-controlled car 1.

Inside the remote-controlled car 1, the steering motor, the drive motor, and the remote control receiving and execution module are electrically connected with the power supply module and receive power from the power supply module. The steering motor and the drive motor are electrically connected with the remote control receiving and execution module. The driving wheels 11 of the remote-controlled car are connected with the driving motor, and the guiding wheels 12 of the remote-controlled car are connected with the steering motor.

The triangle sign 3 is disposed at one end of the remote-controlled car 1, and a reflective area is provided on the surface of the triangle sign 3. Thus, while a traffic accident or a vehicle accident occurs, people can use a remote controller 2 to direct the remote-controlled car 1 to move to a specified location and to prop up the triangle sign 3. It is safe and convenient during the entire process, and a desired advance-warning effect can be achieved.

According to the present invention, the triangle sign 3 may be a foldable triangle sign. The three corners of the triangle sign 3 can be folded toward the center and locked at the center by a locking buckle. A torsion spring 31 is provided at the folding junctures. The shape/contour of the folded triangle sign 3 is the same or substantially similar to the shape/contour of the top of the remote-controlled car 1. The locking buckle includes a latch 29 at each corner of the triangle sign 3 and a latch hole 30 on the remote-controlled car matching up with the latch 29. After being folded, the triangle sign 3 can be locked by the latch 29 being inserted into the latch hole 30. An electromagnetic switch 28 is placed at the locking place of the locking buckle. The electromagnetic switch 28 is electrically connected with the remote control receiving and execution module, such that the remote control 2 can control the open and close state of the locking buckle.

Of course, the torsion spring 31 can be replaced with the other elastic components, such as a tension spring, to connect the three corners of the triangle sign 3.

In operation, the electromagnetic switch 28 can be turned on with the remote control 2, and the three corners of the triangle sign 3 can be automatically unfolded by the action of the torsion springs 31. Also, the electromagnetic switch 28 may be replaced with a manual switch and can be manually turned on before use, and the three corners of the triangle sign 3 also can be automatically unfolded by the action of the torsion spring 31.

A folding motor is mounted inside the remote-controlled car 1. The folding motor is electrically connected with the power supply module and the remote control receiving and execution module respectively. The triangle sign 3 is connected to the folding motor via a folding arm. Because the folding motor, which drives the folding arm, is also mounted inside the body of the remote-controlled car 1, the folding motor is invisible in FIGS. 1 through 8. Thus, after the triangle sign 3 is unfolded, the remote control 2 can be used to control the folding motor to drive the folding arm to move the triangle sign 3 from its horizontal state to the vertical operational state. In this way, the foldable triangle sign 3 can effectively save the storage space during spare time, and is also very convenient to be used.

The upper corner of the triangle sign 3 can be unfolded to form a smaller triangle sign 4. A LED warning light 10 is mounted at the top of the smaller triangle sign 4. The LED warning light 10 is electrically connected with the power supply module and the remote control receiving and execution module respectively. Under the control of the remote control 2, the LED warning light 10 displays flashing red, white, and blue light, so the triangle sign 3 can be obviously visible to the oncoming drivers to avoid the breakdown vehicle.

Under the rain or fog condition, the visibility may be insufficient when only using the LED warning light 10 or the reflective area. Thus, a laser source 9 is mounted on the front face of the smaller triangle sign 4, and the laser source 9 is electrically connected with the remote control receiving and execution module. The laser source 9 can emit red and blue laser beams for warning effect, and can scan the area in front of the remote-controlled car 1 to form a series of larger red and blue laser beam triangular planes. Because blue light usually is not a natural light, when the blue light is used according to the present invention, people can feel the danger from farther distance, greatly increasing the response time.

To prevent the laser beams from damaging people's eyes, the laser source 9 may be configured to aim slightly downward. Therefore, the triangle sign 3 of the present invention can achieve desired advance-warning effect. During the traveling process of the remote-controlled car 1, the laser beams from the laser source 9 is also projected downward on the ground to avoid directly shining into the eyes of the oncoming drivers. In operation, under the control of the remote control 2, the smaller triangle sign 4 and two side corners can be unfolded first, causing the smaller triangle sign 4 perpendicular to the road's surface and, at the same time, the LED warning light 10 is turned on. The entire triangle sign 3 can be propped upright after the remote-controlled car arrives at the designated location. Thus, when the remote-controlled car moves forward in this way, the advance-warning effect can be effected, air resistance can be reduced, the center of gravity can be lowered, and the stability can be improved, which makes the remote-controlled car 1 to reach the destination faster and safer.

In order to achieve a satisfactory braking for the remote-controlled car 1, snow tires may be used as the tires of the remote-controlled car. The surface of the snow tire may be relatively soft. Further, a brake plate 13 is mounted at the lower end of the triangle sign 3. When the triangle sign 3 is unfolded and propped upright, the brake plate 13 can press on the surface of the snow tire of the driving wheels 11, generating significant friction on the surfaces of the snow tires of the driving wheels 11 to achieve braking for the remote-controlled car 1.

Certainly, the triangle sign 3 can be configured in such way that, when the triangle sign 3 is unfolded and propped upright, the triangle sign 3 contacts with the ground. Further, grounding rubber sheet can be placed on the triangle sign 3 at the contact point with the ground, i.e., the bottom surface of the triangle sign 3. After the remote-controlled car 1 reaches the destination, the remote control 2 can be used to control the folding motor to drive the folding arm to prop the triangle sign 3 upright. The bottom surface of the triangle sign 3 touches the road surface through the grounding rubber sheet. The folding motor continues to run and to make the contact points between the grounding rubber sheet and the ground into two pivot points and to elevate the front wheels of the remote-controlled car 1. Thus, the rubber sheet can achieve braking for the remote-controlled car 1, which can prevent the movement of the remote-controlled car 1 due to uneven road surface or other environmental factors, ensuring the stability of the remote-controlled mobile triangle sign.

Obviously, the larger the size of the triangle sign 3, the better the advance-warning effect. However, if the size of the triangle sign 3 is larger, the size of the remote-controlled car 1 also needs be increased to meet its support role. Thus, in this present invention, the remote-controlled car 1 is configured to contain a front car body 1a and a rear car body 1b to make the entire body expandable and retractable. The front car body 1a and the rear car body 1b are connected by a locking groove 21a. Through the locking groove 21a, the car body of the remote-controlled car 1 can be freely expanded or retracted, satisfying the requirements of actual operation as well as of saving the storage space. In addition, in the present invention, certain components may be used to make the two back wheels stretch or shrink along the wheel axial direction. Thus, the contact surface can be increased, center of gravity can be lowered, requirements of different road conditions can be satisfied, and the stability of the remote-controlled car 1 when running or parked can be improved.

Of course, to be used normally under different weather conditions, all electrical materials and electrical connectors are treated for waterproof to ensure high levels of climate tolerance.

Further, an LED lamp 20, electrically connected with the remote control receiving and execution module, and a reflective region are arranged on the back of the smaller triangle sign 4. The LED lamp 20 can make it easy for the person controlling the remote-controlled car 1 to determine the direction and travel distance of the remote-controlled car. The reflective region can make it easy for the drivers in the vehicles traveling direction to see the advance-warning sign, indicating the hazard information.

The LED flashing lights 14 are arranged respectively on each side of the head of the remote-controlled car 1 and are electrically connected respectively to the remote control receiving and execution module. During operation, the LED flashing lights 14 keep flashing light. Further, reflective materials are used on both the front of the triangle sign 3 and its reverse side to increase the effects of advance-warning.

Thus, overall, the LED warning light 10, the laser source 9, the electromagnetic switch 28 on locking structure, the LED lamp 20, and the LED flashing lights 14 can be controlled by the remote control 2 through the function-key group 25 for easy operation.

In addition, a functional setting switch 17 is disposed on the remote-controlled car 1, which can be used to set fixed mode and/or appropriate functional settings according to the requirements of actual situations of the accidents. For example, the flashing time and frequency, of the LED warning light 10 and the LED flashing lights 14 can be set, and whether to use the laser source 9 and the strength of the laser beam and the scanning range can also be set, etc.

A transmitting antenna 26 is mounted on the remote control 2 and a receiving antenna 15 is mounted on the remote-controlled car 1, which can meet the requirement for long range remote control and achieve desired remote control effect.

Figure 9:
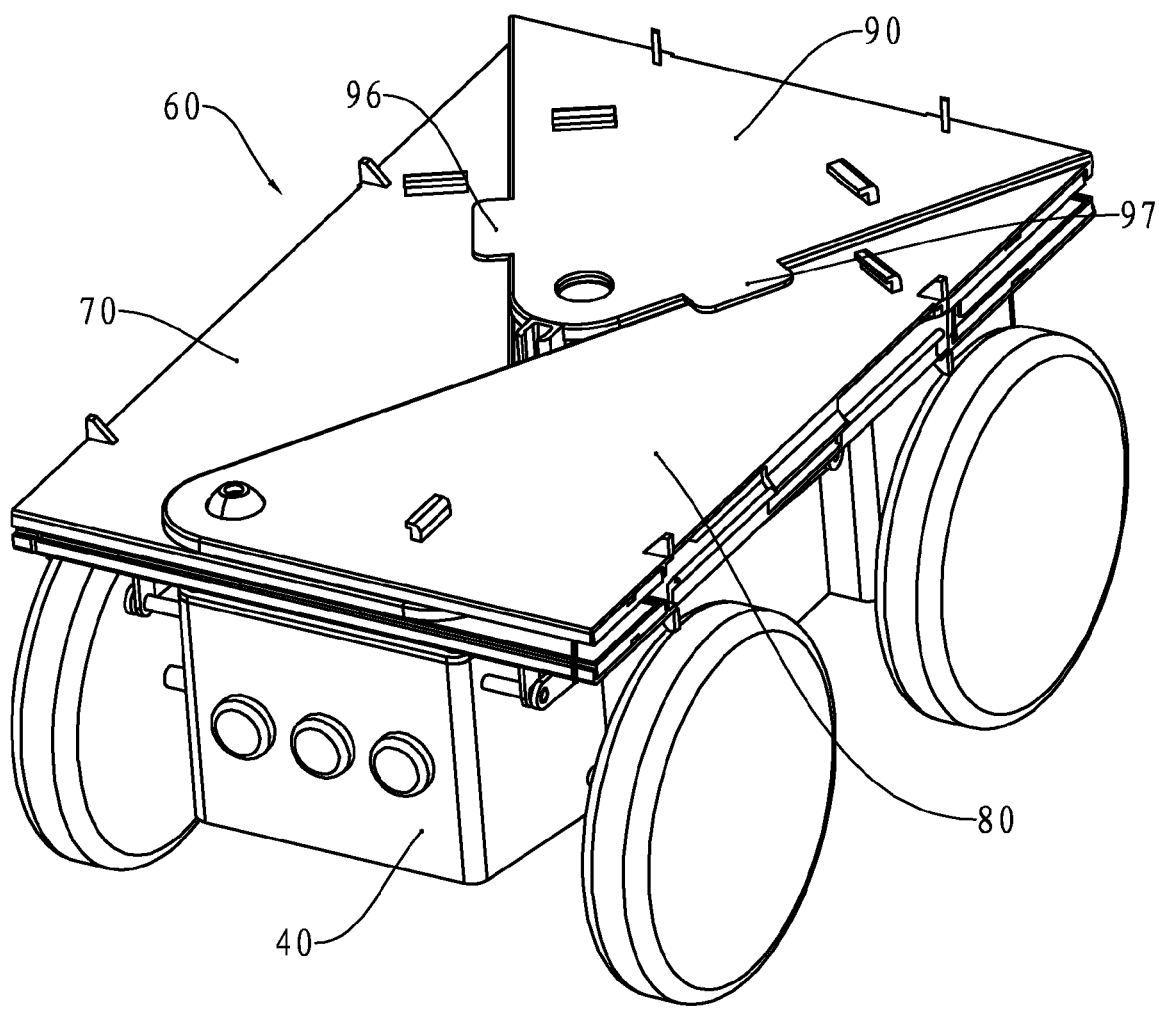
FIG. 9 illustrates a structural diagram of a folded state of the second embodiment of the present invention.

Referring to FIG. 9, according to another embodiment of the present invention, the remote-controlled mobile triangle sign includes a remote-controlled car 40 and a triangle sign 60 mounted on the top of the remote-controlled car 40, and also include a remote control similar to the one describe above. The remote controller is used to send control signals to the remote control receiving and execution module to control the operation of the remote-controlled car and the triangle sign.

Figure 10:
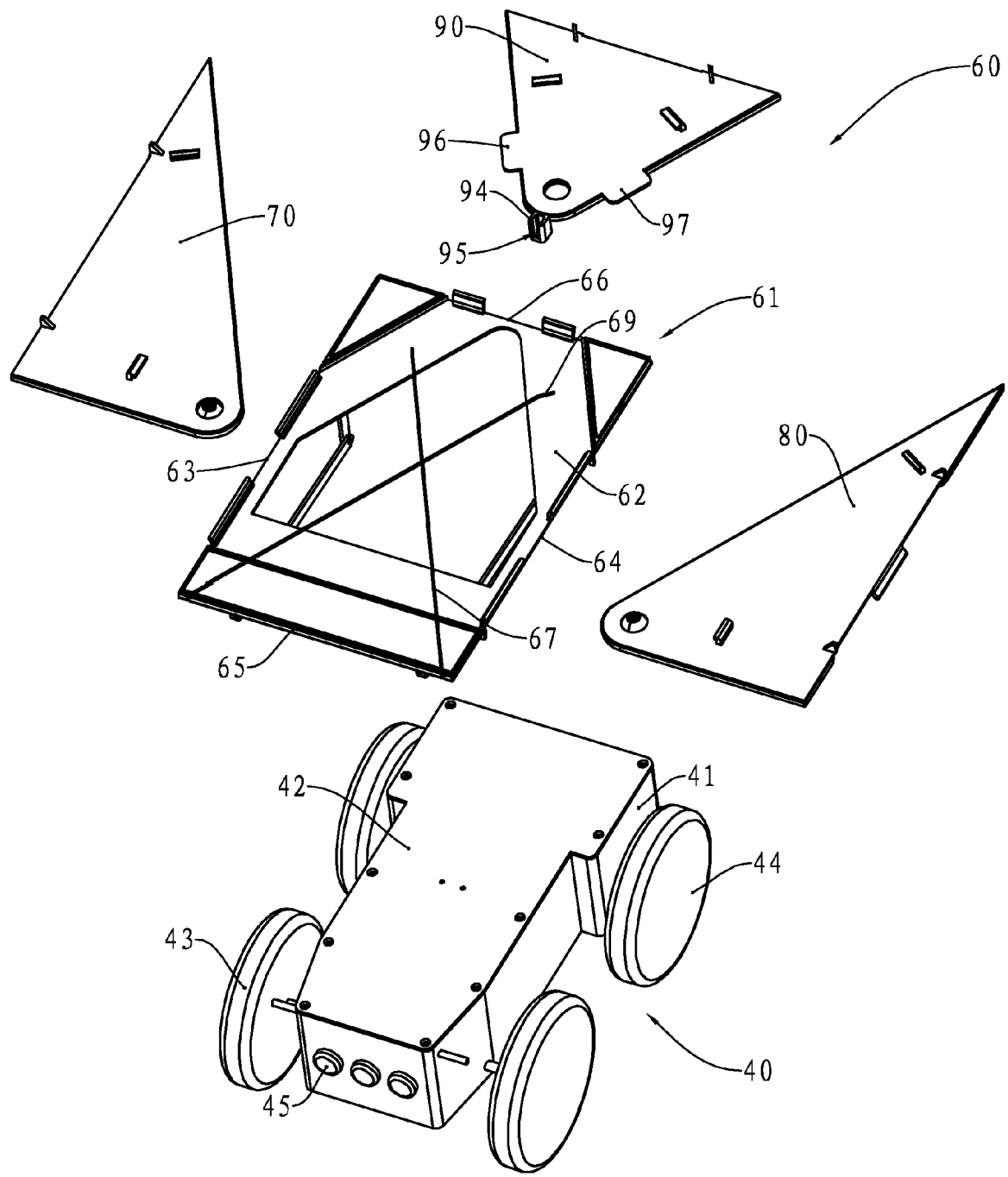
FIG. 10 illustrates a structural diagram of an exploded view of the second embodiment of the present invention.

Referring to FIG. 10, the remote-controlled car 40 includes a housing 41 and a top cover 42 at the upper end of the housing 41. The housing 41 and the top cover 42 form a chamber, and a drive motor, a steering motor, a power supply module, and the remote control receiving and execution module are installed within the chamber. Guiding wheels 43 on the front of the remote-controlled car 40 and drive wheels 44 on the rear of the remote-controlled car 40 are mounted outside of the housing 41. Flashing light 45, electrically connected with the remote control receiving and execution module, is disposed on the front outer wall of the housing 41. The flashing light 45 is powered by the power supply module.

The triangle sign 60 may comprise a support plate 61, a first folding member 70, a second folding member 80, and a third folding member 90. The first folding member 70, the second folding member 80, and the third folding member 90 can be folded relative to the support plate 61, so that the triangle sign 60 can achieve two states, a folded state and an expanded or unfolded state. As shown in FIG. 9, the triangle sign 60 is in the folded state.

Figure 11:
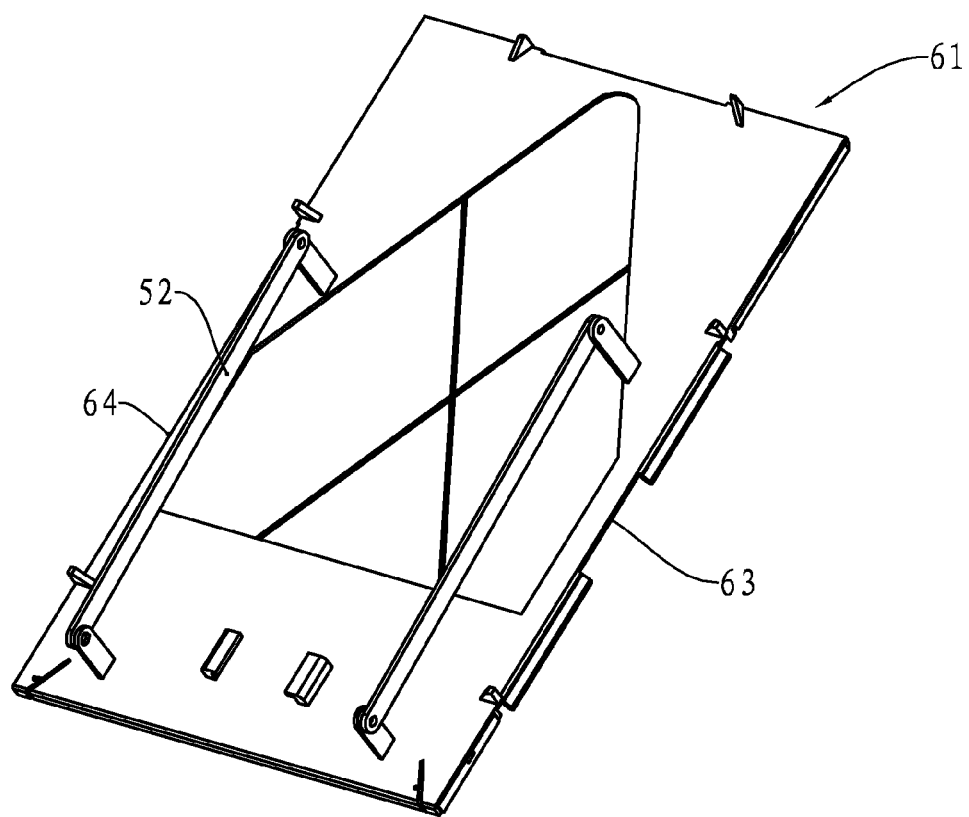
FIG. 11 illustrates a structural diagram of a support plate of the second embodiment of the present invention.

As shown in FIGS. 10 and 11, the back of the support plate 61 is fixedly connected with the folding arm 52, such that the support plate 61 is supported by the folding arm 52. The folding arm 52 is driven by the folding motor installed in the remote-controlled car 40 to rotate. The support plate 61 has a plate surface 62, the plate 62 has a first edge 63 located on the left, a second edge 64 located on the right, a bottom edge 65 located at the lower end, and a top edge 66 located at the upper end.

Two windproof rods 67 are disposed on the front side of the support plate 61, i.e., the side back-facing the top cover 42 of the remote-controlled car 40. One end of each windproof rod 67 is fastened on the support plate 61 through a tension spring 68 (shown in FIG. 15). One end of the tension spring 68 is fixed to the bottom edge 65 of the support plate 61, and the other end is connected to the windproof rod 67. The other end of the windproof rod 67 is a free end, for supporting on the ground.

Grounding rubber sheets are mounted on the lower-end surface of the triangle sign 60, i.e., the bottom edge 65 of the support plate 61, for braking the remote-controlled car 40.

Figure 12:
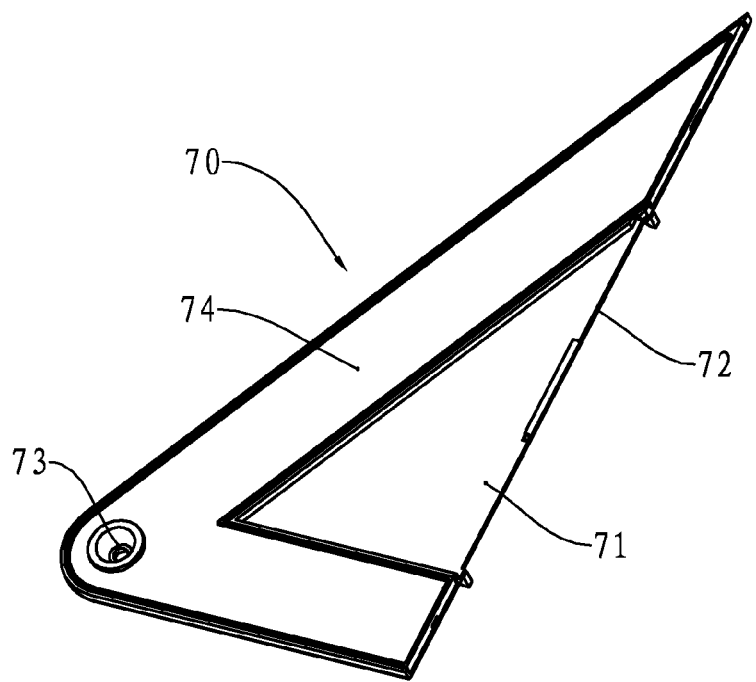
FIG. 12 illustrates a structural diagram of a first folding member of the second embodiment of the present invention.

When the triangle sign 60 is in the folded state, the first folding member 70 is located above the support plate 61. When the triangle sign 60 is in the expanded state, the first folding member 70 is located on the left side of the support plate 61. Referring to FIG. 12, the first folding member 70 is in a shape of a right triangle, which has a plate body 71, a right-angle edge 72 adjacent with a first side 63 of the support plate 61, and the first folding member 70 and the support plate 61 are connected by an elastic member, such as a torsion spring. Of course, it is also possible to use a tension spring to connect the support plate 61 and the first folding member 70, when both ends of the tension spring are fixed to the back of the support plate 61 and the back of the first folding member 70, respectively.

An LED warning light 73 is located on a vertex of the first folding member 70, and the hypotenuse of the first folding member 70 is its frame 74. Preferably, the frame 74 of the first folding member 70 is coated with a reflective material to form a reflective region.

Figure 13:
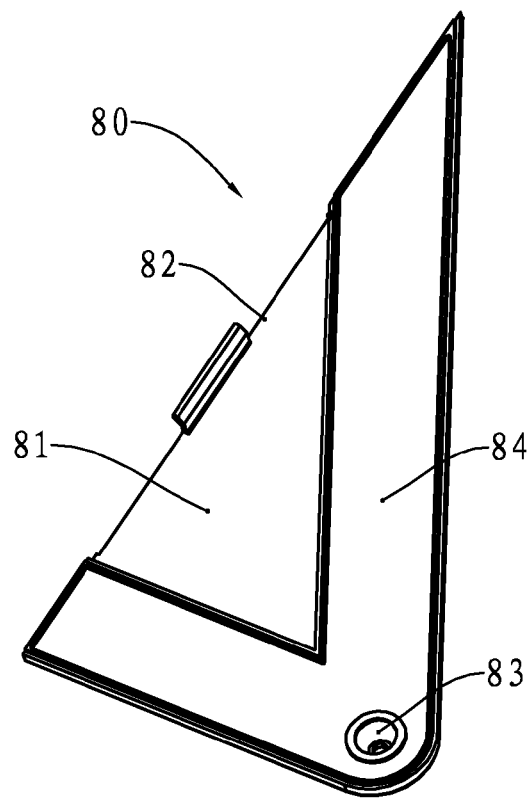
FIG. 13 illustrates a structural diagram of a second folding member of the second embodiment of the present invention.
Figure 14:
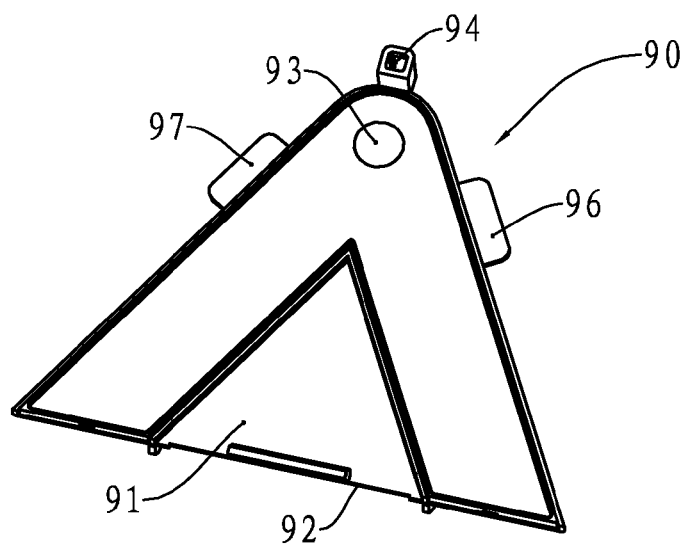
FIG. 14 illustrates a structural diagram of a third folding member of the second embodiment of the present invention.

When the triangle sign 60 is in the folded state, the second folding member 80 is located above the first folding member 70. When the triangle sign 60 is in the expanded state, the second folding member 80 is located on the right side of the support plate 61. Referring to FIG. 13, the second folding member 80 has a plate body 81, a right-angle edge 82 adjacent with a second side 64 of the support plate 61, and the second folding member 80 and the support plate 61 are connected by an elastic member, such as a torsion spring. Of course, it is also possible to use a tension spring to connect the support plate 61 and the second folding member 80.

An LED warning light 83 is located on a vertex of the second folding member 80, and the hypotenuse of the second folding member 80 is its frame 84. Preferably, the frame 84 of the second folding member 80 is coated with a reflective material to form a reflective region.

When the triangle sign 60 is in the folded state, the third folding member 90 is located above the second folding member 80. When the triangle sign 60 is in the expanded state, the third folding member 90 is located on above the top edge 66 of the support plate 61. The third folding member 90 is in a shape of a substantially equilateral triangle, which has a plate body 91, and a bottom side 92 adjacent with the top edge 66 of the support plate 61. The third folding member 90 and the support plate 61 are connected by an elastic member, such as a torsion spring. Of course, it is also possible to use a tension spring to connect the support plate 61 and the third folding member 90.

An LED warning light 93 is located on a top vertex of the third folding member 90, and a locking buckle 94 is mounted on the top of the third folding member 90. As shown in FIG. 10, the locking buckle 94 has a locking latch hole 95. In addition, two sides of the third folding member 90 have a nip member 96 and a nip member 97. When the triangle sign 60 is in the folded state, the nip member 96 and the nip member 97 are pressed on the top of the first folding member 70 and the second folding member 80, respectively.

An LED lamp is disposed on the back of the third folding member 90, such that the user of the remote-controlled mobile triangle sign can observe the movement of the remote-controlled mobile triangle sign by the LED lamp.

Figure 15:
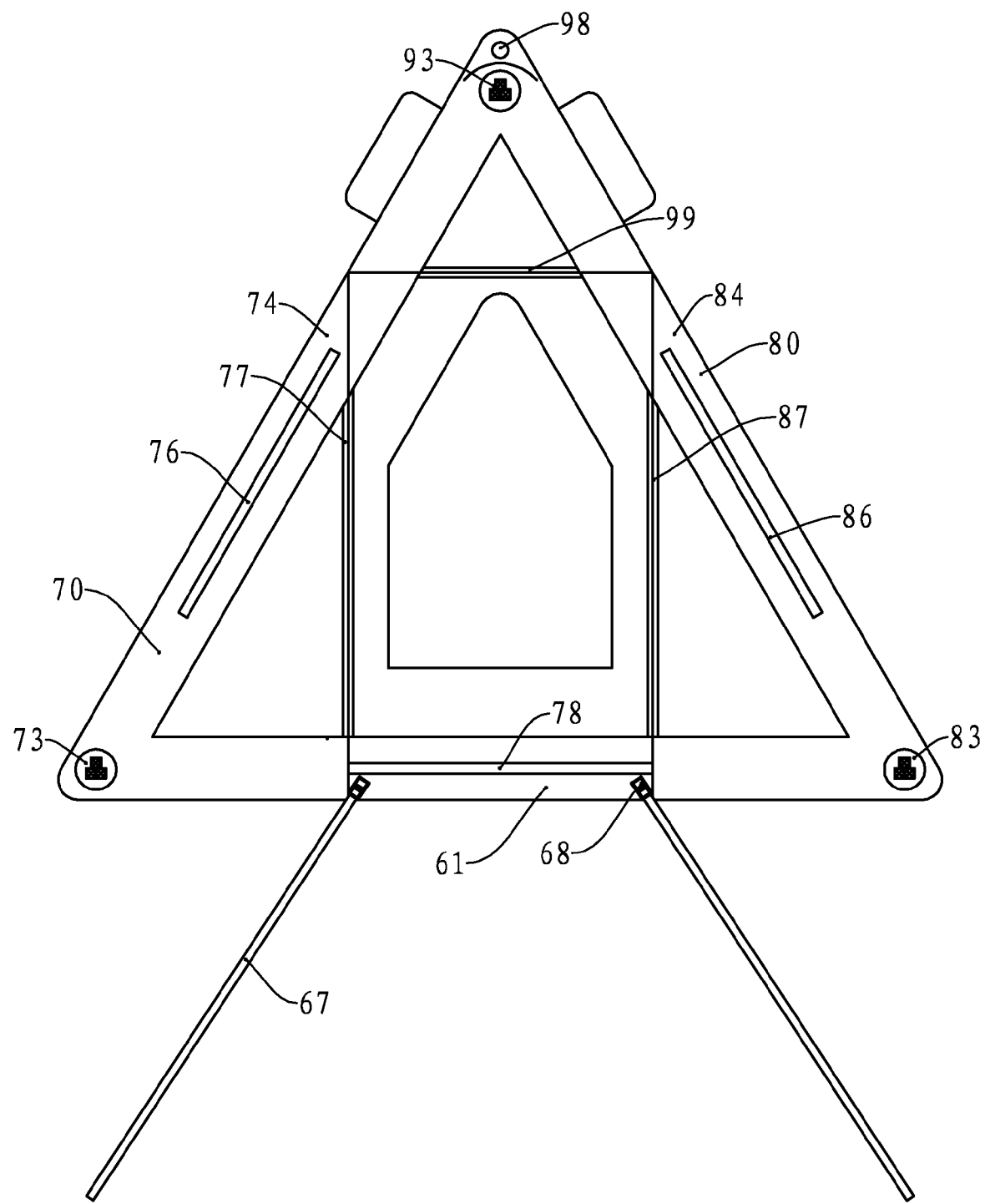
FIG. 15 illustrates a structural diagram of an unfolded triangle sign of the second embodiment of the present invention.

Referring to FIG. 15, after the triangle sign 60 is expanded or unfolded, the first folding member 70 is fixed to the left side of the support plate 61 via the torsion spring 77, the second folding member 80 is fixed to the right side of the support plate 61 by the torsion spring 87, and the third folding member 90 is fixed to the top of the support plate 61 by the torsion spring 99. The support plate 61, the first folding member 70, the second folding member 80, and the third folding member 90 together form a larger triangle sign.

The LED warning lights 73, 83, and 93 on the three corners of the triangle sign 60, respectively, emit red, white, and blue light for warning the oncoming cars. Further, a laser source 98 is disposed at the top of the third folding member 90 and, under the control of the remote control receiving and execution module, emits blue laser beam. Preferably, the laser source 98 emits laser beams downwardly, so as to prevent the laser beam from directly shining into the eyes of drivers from oncoming cars.

Three strip-shaped LED warning lights 76, 86, and 78 are disposed on the front face of the triangle sign 60, located at the frame 74 of the first folding member 70, the frame 84 of the second folding member 80, and at the edge of the support plate 61, respectively. The LED warning lights 76, 86, and 78 are respectively combined with the circular LED warning lights 73, 83, and 93 to form exclamation marks, making it much easier for the drivers of oncoming cars to notice the triangle sign 60.

Further, torsion spring, as an elastic member, is disposed between the bottom 65 of the support plate 61 and the top cover 42 of the remote-controlled car 40, such that the triangle sign 60 can be inclined at a certain angle, when being unfolded, to prevent the support plate 61, the first folding member 70, and the second folding member 80 from pressing the guiding wheels 43, which may impact movement of the remote-controlled car 40.

Figure 16:
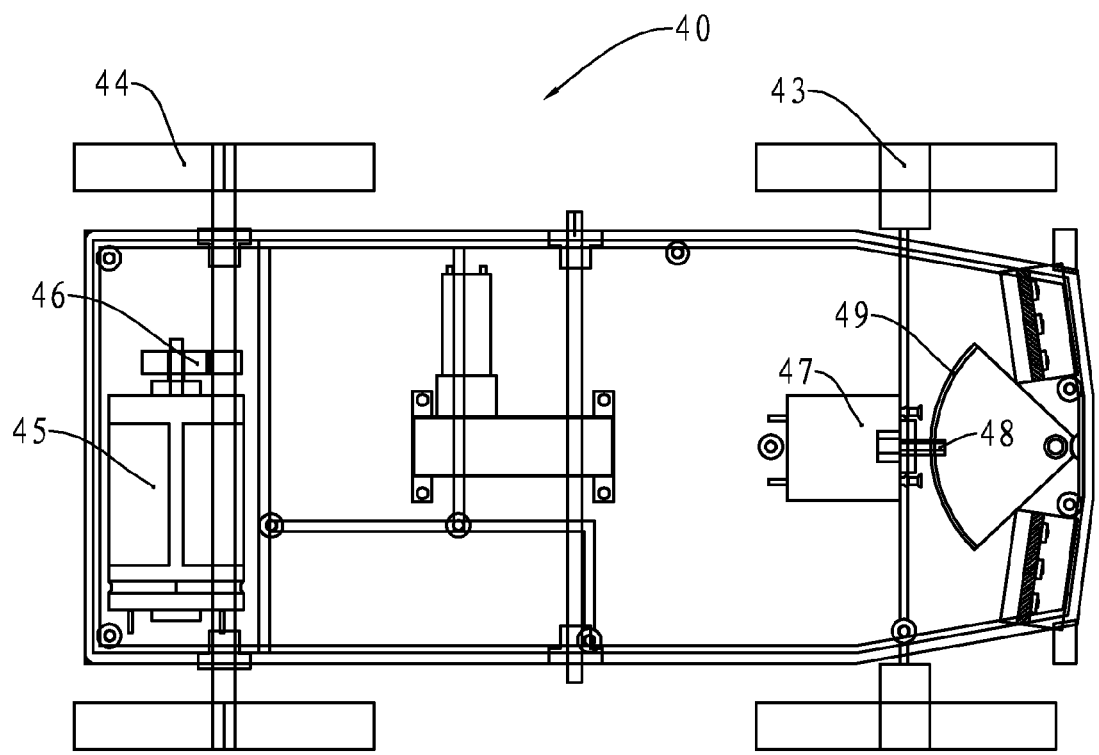
FIG. 16 illustrates a structural diagram of a remote-controlled car of the second embodiment of the present invention.

Referring to FIG. 16, the remote-controlled car 40 equipped with a drive motor 45 located on the rear of the vehicle body. The drive motor 45, through the drive gear 46, drives the drive wheel 44 to rotate. A steering motor 47 is installed on the front of the vehicle body. The rotating shaft 48 of the steering motor 47 can slide within the arc chute 49, leading the guiding wheels 43 to rotate.

Figure 17:
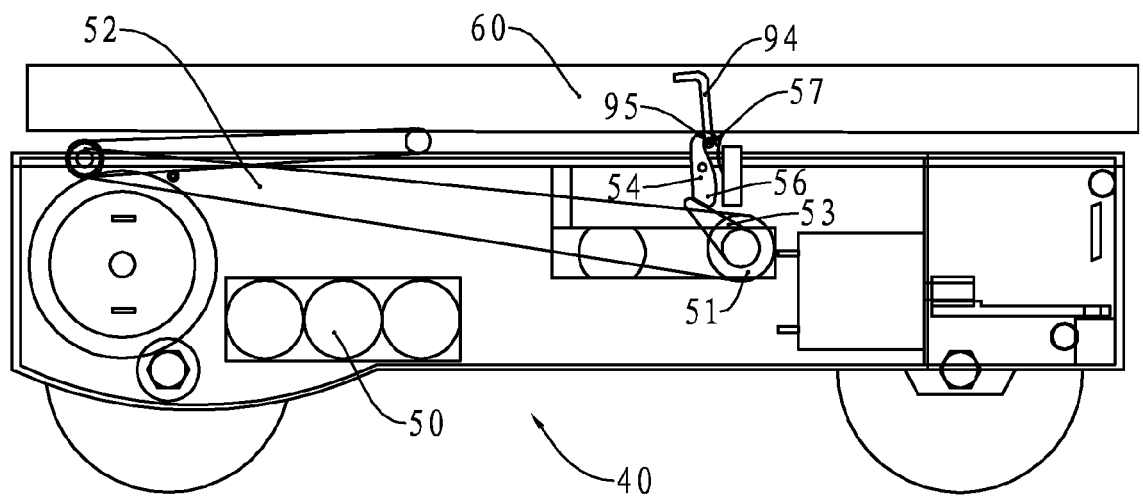
FIG. 17 illustrates a structural diagram of a folded triangle sign and a remote-controlled car of the second embodiment of the present invention.

Referring FIG. 17, the remote-controlled car 40 is also equipped with a battery pack 50 as the power supply module to supply power to the drive motor 45 and the steering motor 47. Further, a folding motor 51 is also mounted within the remote-controlled car 40, which drives the folding arm 52 to rotate, so that the support plate 61 is rotated upward around its bottom edge 65 to the unfolded state.

Further, a locking hook with a shape of approximate "S" is disposed on the top of the remote-controlled car 40. The middle portion of the locking hook 54 is fixed on the remote-controlled car 40 using a pin, and the first end of the locking hook 54 can be inserted into the locking latch hole 95. The remote-controlled car 40 is also equipped a rotating motor, and the rotating motor can drive a paddle 53 to rotate. One end of the paddle 53 presses on the second end 56 of the locking hook 54, and can drive locking hook 54 to rotate. In this embodiment, in order to reduce the number of motors, the folding motor 51 may also be used as the rotating motor, driving the paddles 53 and the locking hook 54 to rotate.

Figure 18:
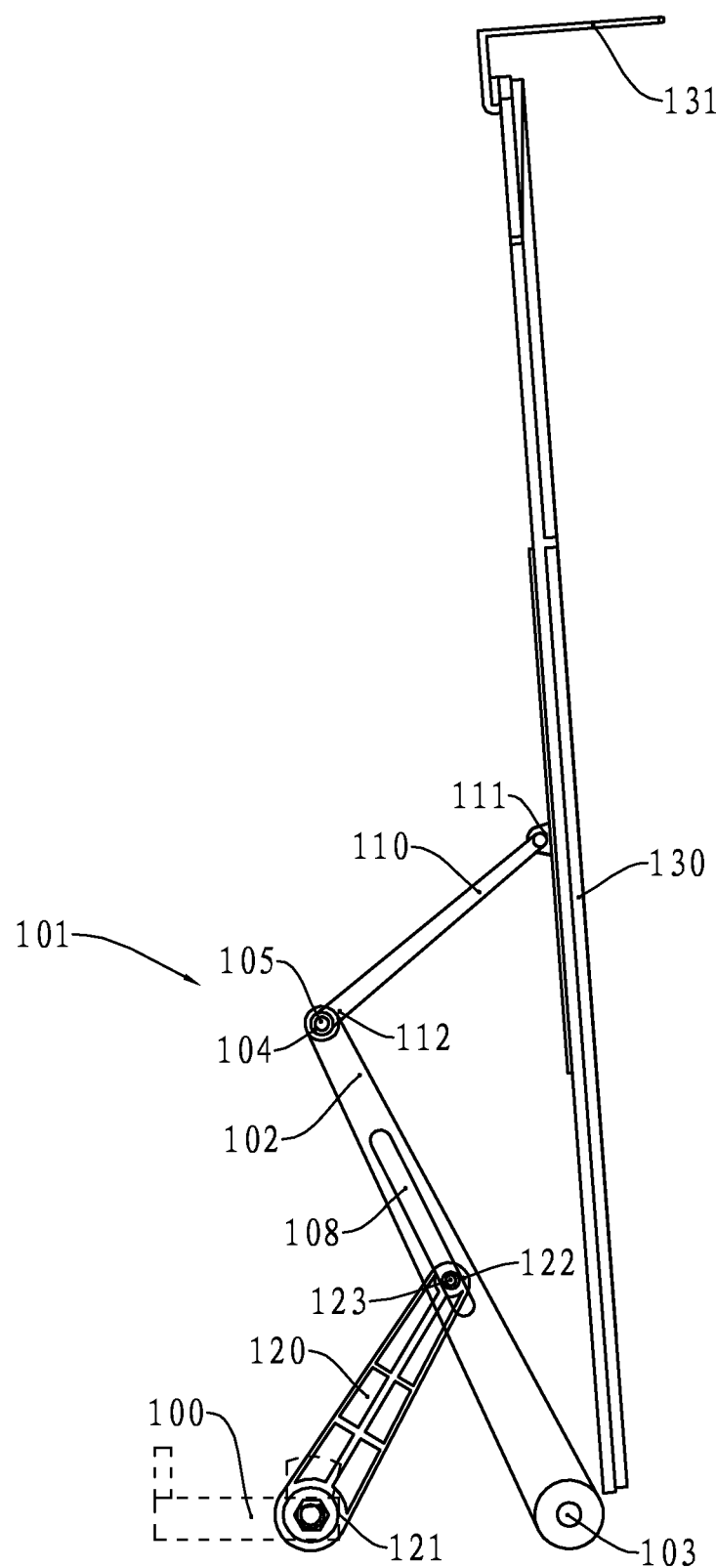
FIG. 18 illustrates a structural diagram of a folding motor, folding arm, and support plate of the third embodiment of the present invention.

In addition, the folding arm can also have other implementations. Referring to FIG. 18, the folding arm 101 may have a first lever 102 and a second lever 110 hinged together. A first end 103 of the first lever 102 is hinged on the remote-controlled car, and a second end 104 of the first lever 102 is hinged with a second end 112 of the second lever 110. The central portion of the first lever 102 has an elongated sliding chute 108. A first end 111 of the second lever 110 is fixed on the support plate of the triangle sign 130. A locking buckle 131 is mounted on the top of the triangle sign 130, and the locking buckle 131 extends outward from the front face of the triangle sign 130 to facilitate people to lift the triangle sign 130.

The drive motor 100 drives the driving lever 120 to rotate, and the first end 121 of the driving lever 120 receives driving force from the drive motor 100. The second end 122 has a latch 123, and the latch 123 can be inserted into the chute 108, and moves back and forth in the chute 108.

Thus, when the drive motor 100 drives the driving lever 120 to rotate, the latch 123 may slide within the slide chute 108, which leads the folding arm 101 to rotate, thus driving the triangle sign to rotate. Because, when the drive lever 120 starts initial rotation, the latch 123 slides in the slide chute 108, the starting resistance of the driving motor 100 is small, making it easy for the driving motor 100 to start smoothly.

Of course, the triangle sign can be designed in a tower, or other shapes, so that the reflective material may be coated on one of the surfaces to form a reflective region, or the reflective material may be coated on all surfaces to form reflective regions. Also, on each outer surface of the triangle sign, whether it is a front surface or a back surface, LED warning lights and laser sources can be arranged. Or the laser sources may only be disposed on one of the front surface and back surface.

Industry Applicability

Thus, according to the first embodiment of the present invention, when a car breakdown occurs during traveling, the driver places the remote-controlled car 1 on the road, and uses the remote control to control the remote-controlled car 1 to move in the specified direction. Meanwhile, the driver controls the opening of the electromagnetic switch 28, so that the three corners of the triangle sign 3 open automatically. In this process, a smaller triangle sign 4 is unfolded, LED warning lights 10 and LED flashing light 14 are turned on, the LED warning lights 10 keep flashing red, white and blue lights to provide advance-warning signals, and the LED flashing light 14 continues the blinking lights, strengthening advance-warning signals.

The remote-controlled car continues to move forward and arrives at the designated location, through the remote control 2, the driver controls the folding motor 7 to prop the entire triangle sign upright on the remote-controlled car 1. At the same time, the folding arm 8 also makes the smaller triangle sign 4 to flip and guarantees the triangle sign 3 is on a same plane. The folding motor 7 is controlled to continue rotating, so that the friction plate 13 on the lower end surface of the triangle sign 3 presses the tires of the driving wheels 11, achieving braking of the remote-controlled car 1. At this time, the remote-controlled car no longer moves, thus the triangle sign 3 is well placed quickly to achieve good advance-warning effect. If under the rain and fog weather condition, the laser source 9 can be turned on by the remote control 2 to cover the front of the remote-controlled car 1 with red and blue laser beam having warning effect, improving the visibility and achieving better warning effect.

According to the second embodiment of the present invention, when the remote-controlled mobile triangle sing is not in use, the triangle sign 60 is in the folded state, and the remote-controlled mobile triangle sign is in the state shown in FIG. 9. The first folding member 70, the second folding member 80, and the third folding member 90 are in turn folded on top of the support plate 61, and the two nip member 96 and 97 of the third folding member 90 are pressed on the first folding member 70 and the second folding member 80, respectively. The first end 57 of the latch 54 hooks into the locking latch hole 95 of the locking buckle 94, and the third folding member 90 is fixed to the support plate 61.

When using the remote-controlled mobile triangle sign, first the drive motor 45 drives the driving wheels 44 to rotate, and the remote-controlled car 40 moves forward. At the same time, the folding motor 51 starts to rotate and drive the paddle 53 to rotate. The paddle 53 drives the latch paddles rotate the latch 54, such that the first end 57 of the latch 54 exits from the locking latch hole 95 and, under the action of the torsion spring 99, the third folding member 90 rotates around the top edge 66 of the support plate 61, facing upward. At this time, the second folding member 80 and the first folding member 70 are also unfolded to the right and left under the action of the torsion springs 87 and 77, respectively. Two windproof levers 67 are also expanded under the action of the tension spring 68, facilitating to unfold the first folding member 70 and the second folding member 80.

Further, the support plate 61 rotates upward for at a certain angle under the action of the torsion spring between the support plate 61 and the top cover 42 of the remote-controlled car 40, so as to avoid the support plate 61 being pressed against the guiding wheels 43 and also to make the triangle sign 60 to rotate upwardly at a certain angle.

With the remote-controlled car 40 moving forward, LED warning lights 73, 83, 93 and 76, 86, 78 emit flashing light, warning the oncoming car drivers.

After the remote-controlled car 40 reaches the designated location, the folding motor 51 drives the folding arm 52 to rotate, so that the expanded triangle sign 60 is propped upright, the grounding rubber sheet at the lower end of the triangle sign 60 contacts the road surface to achieve braking of the remote-controlled car 40. At this time, the driver can see the expanded triangle sign 60, and can take timely avoidance measures.

Ends of the two windproof rods 67 on the front of the triangle sign 60 press against the ground, prevent the triangle sign 60 being blown down by the wind.

The two above embodiments are example only, and do not limit the present invention. Without departing from the spirit and scope of the present invention, any equivalent modifications or changes thereof shall be included in claims of the present invention. Also, the color of the LED and the color of the laser beam from the laser source may be adjusted according to usage habits of individual countries.

The present invention is easy to use, fast, safe, and with good advance-warning effect, having a wide range of applications in the automobile triangle sign field.

The invention claimed is:

1. A remote-controlled mobile warning sign, comprising:
    a warning sign having at least one surface with a reflective area;
    a remote control configured to transmit control signals; and
    a remote-controlled car including:
        a power supply module;
        a drive motor powered by the power supply module; and
        a remote control receiving and execution module for receiving the control signals, wherein the warning sign is mounted on top of the remote-controlled car, and the remote control receiving and execution module is electrically connected to the drive motor and provides output signals,
    wherein the warning sign is a foldable triangle sign, an upper corner of which is a triangle sign smaller than the foldable triangle sign, and the smaller triangle sign is capable of being unfolded to be perpendicular to a road's surface while the remote-controlled car is driving on the road.

2. The remote-controlled mobile warning sign according to claim 1,
    wherein the remote-controlled car further includes:
    a folding motor configured to receive the output signals from the remote control receiving and execution module and being connected with the warning sign through a folding arm.

3. The remote-controlled mobile warning sign according to claim 2,
    wherein the folding arm includes:
    a first lever and a second lever hinged together, wherein one end of the first lever is hinged on the remote-controlled car, one end of the second lever is fixed on the support plate, and the first lever has an elongated sliding chute; and
    a driving lever driven by the folding motor, an end of the driving lever has a latch being inserted into the sliding chute and moving back and forth in the sliding chute.

4. The remote-controlled mobile warning sign according to claim 1,
    wherein:
    a front surface and/or a back surface of the warning sign is provided with a laser source electrically connected to the remote control receiving and execution module.

5. The remote-controlled mobile warning sign according to claim 4,
    wherein:
    the laser source emits flashing laser beam.

6. The remote-controlled mobile warning sign according to claim 4,
    wherein:
    the laser source emits laser beam downwardly.

7. The remote-controlled mobile warning sign according to claim 1,
    wherein:
    the warning sign includes a support plate supported by the folding arm;
    a first folding member and a second folding member are disposed at two sides of the support plate, respectively, the support plate is connected with the first folding member through a first elastic member, and the support plate is connected with the second folding member through a second elastic member; and
    a third folding member is disposed on top of the support plate, and the support plate is connected with the third folding member through a third elastic member.

8. The remote-controlled mobile warning sign according to claim 7,
    wherein:
    at least one nip member is disposed on edges of the third folding member, and the at least one nip member is pressed on the first folding member and the second folding member; and
    a locking latch hole is disposed on a front surface of the third folding member, and a latch capable of being inserted into the locking latch hole is disposed on the remote-controlled car.

9. The remote-controlled mobile warning sign according to claim 8,
    wherein:
    a rotating motor mounted inside the remote-controlled car, and the rotating motor drives a paddle to rotate; and
    one end of the paddle presses on one end of the latch to drive the latch to rotate.

10. The remote-controlled mobile warning sign according to claim 7,
    wherein:
    the support plate is connected to top of the remote-controlled car with a fourth elastic member.

11. The remote-controlled mobile warning sign according to claim 7,
    wherein:
    a first LED warning light is disposed on a top corner of each of the first folding member, the second folding member, and the third folding member; and
    an LED lamp is disposed on back of the third folding member.

12. The remote-controlled mobile warning sign according to claim 11, wherein:
    one or more second LED warning light is disposed on front of the warning sign.

13. The remote-controlled mobile warning sign according to claim 1,
    wherein:
    three corners of the triangle sign are capable of being folded toward a center and locked by a locking buckle;
    elastic components are placed at folding junctures of the three corners;
    the locking buckle includes latches arranged on the three corners of the triangle sign and a locking latch hole matching the latches on the remote-controlled car; and
    the locking buckle has an electromagnetic switch electrically connected with the remote control receiving and execution module.

14. The remote-controlled mobile warning sign according to claim 13, wherein:
the upper corner of the triangle sign is unfolded to form the smaller triangle sign;
an LED warning light electrically connected with the power supply module and the remote control receiving and execution module is mounted at a front surface of the smaller triangle sign; and
an LED lamp for determining a remote control distance is mounted at a back surface of the smaller triangle sign.

15. The remote-controlled mobile warning sign according to claim 1,
further including:
at least one windproof rod disposed on front of the warning sign, with one end of the windproof rod being connected to the front of the warning sign with a fifth elastic member.

16. The remote-controlled mobile warning sign according to claim 1, wherein:
a grounding rubber sheet is disposed on a bottom end of the warning sign.

17. The remote-controlled mobile warning sign according to claim 1,
wherein:
a friction sheet is disposed on a bottom end of the warning sign and, when the warning sign is propped upright, presses on tires of the remote-controlled car.

18. The remote-controlled mobile warning sign according to claim 1,
wherein:
the remote-controlled car includes a front car body and a rear car body, the front car body and the rear car body are stretchable and retractable against each other and are connected by a locking groove.

19. The remote-controlled mobile warning sign according to claim 1,
wherein:
a flashing light electrically connected with the remote control receiving and execution module is mounted on an outer wall of the remote-controlled car.

20. The remote-controlled mobile warning sign according to claim 1,
wherein:
the remote-controlled car includes a steering motor powered by the power supply module.

* * * * *